United States Patent [19]

Stelter et al.

[11] Patent Number: 4,754,835
[45] Date of Patent: Jul. 5, 1988

[54] CONTROL ARRANGEMENT FOR FOUR-WHEEL DRIVE VEHICLES

[75] Inventors: Norbert Stelter, Weissach; Matthias Dietz, Stuttgart; Lothar Witte, Vaihingen; Rainer Wuest, Im Kruegele, all of Fed. Rep. of Germany

[73] Assignee: Dr. Ing. h.c.F. Porsche Aktiengesellschaft, Stuttgart, Fed. Rep. of Germany

[21] Appl. No.: 787,073

[22] Filed: Oct. 15, 1985

[30] Foreign Application Priority Data

Oct. 12, 1984 [DE] Fed. Rep. of Germany ....... 3437435

[51] Int. Cl.$^4$ .............................................. B60K 17/34
[52] U.S. Cl. ...................................... 180/248; 180/233
[58] Field of Search ............... 180/233, 247, 248, 249, 180/250, 197, 252, 242, 243, 70.1; 74/483 R, 856

[56] References Cited

U.S. PATENT DOCUMENTS

| | | | |
|---|---|---|---|
| 3,411,601 | 11/1968 | Arkus-Duntov | 180/248 |
| 4,086,563 | 4/1978 | Backman | 180/197 |
| 4,353,272 | 10/1982 | Schneider et al. | 74/857 |
| 4,466,502 | 8/1984 | Sakai | 180/248 |

FOREIGN PATENT DOCUMENTS

| | | |
|---|---|---|
| 0043237 | 1/1982 | European Pat. Off. . |
| 0076148 | 4/1983 | European Pat. Off. . |
| 0112421 | 7/1984 | European Pat. Off. . |
| 176119 | 10/1984 | Japan .................. 180/233 |
| 1168031 | 4/1968 | United Kingdom . |
| 2058994 | 8/1980 | United Kingdom . |
| 2104178 | 3/1983 | United Kingdom . |
| 2118666 | 11/1983 | United Kingdom . |
| 2132303 | 12/1983 | United Kingdom . |
| 1039746 | 9/1983 | U.S.S.R. ............... 180/233 |

OTHER PUBLICATIONS

Automotive Handbook, Bosch (1984), 256-260 and 330.
Vol Berichte (Reports), Nr. 466, p. 106 (1983).

Primary Examiner—John J. Love
Assistant Examiner—Everett G. Diederiks, Jr.
Attorney, Agent, or Firm—Barnes & Thornburg

[57] ABSTRACT

A control arrangement for a four-wheel drive vehicle which has at least one gear box or differential with controllable power transmission characteristics having circuitry for producing control signals in response to vehicle operating conditions and parameters. The arrangement allows for control of the distribution of torque to the respective wheels of the vehicle as a function of a selected number of parameters, such as relative or average wheel speed, engine speed, gas pedal or throttle valve angle, etc. The arrangement contemplates the simultaneous control of more than one adjustable gear box or differential as a function of commonly and/or separately sensed parameters.

57 Claims, 4 Drawing Sheets

CONTROL ARRANGEMENT FOR FOUR-WHEEL DRIVE VEHICLES

BACKGROUND AND SUMMARY OF THE INVENTION

The invention relates to a control arrangement for controlling the transmission of power to the axles and wheels of four-wheel drive vehicles.

Motor vehicles having a drive system with only two driven axles often have insufficient traction when the vehicle is accelerated under bad road conditions. For this reason, high-performance and cross-country motor vehicles are often equipped with a permanent four-wheel drive. Generally, the driving behavior of such vehicles can stand to be improved, especially in as much as maneuverability and steering in tight curves is concerned. In addition, good performance characteristics sometimes lead to an overrating of the overall driving behavior of the vehicle which can result in critical driving situations, especially when the vehicle (despite the overall good performance characteristics) can no longer be steered along an indicated course of the turn. A "catching" of this vehicle by drivers of limited experience, which in the case of conventionally driven vehicles, can be achieved by causing a measured change of load or by applying a rear-axle-locking brake, is therefore not possible.

In order to improve the traction, it is suggested in U.S. Pat. No. 3,411,601 to distribute the driving torque generated by the internal-combustion engine at the two driven axles, taking into account the loads placed on the driving axles under varying driving conditions and the maximally applicable pull forces. However, this takes place only as a function of the vehicle acceleration (or as a function of the speed or the gear), so that driving around curves is not improved. In addition, mechanical requirements are considerable because in each case two hydrodynamic torque converters and transmissions are required.

A switching-off of the locking device for differential gears of motor vehicles as a function of the steering angle is known from German Patent No. 459,638. In this type of system, the maneuverability of the vehicle is improved considerably, but an abrupt switching-off of the lock under bad road conditions can lead to unexpected vehicle driving instability resulting from the jolt caused by the inertia of the drive system.

It is therefore an object of this invention to provide an arrangement for the control of the power transmission to the axles of a four-wheel drive motor vehicle in which the traction advantages of four-wheel drive and the maneuvering advantages of two-wheel drive are combined, while avoiding the respective disadvantages of either system and while maintaining a simple mechanical structure with a relatively small number of sensed operating and driving parameters and requiring relatively low-level control technology to implement.

This and other objects are achieved in a control arrangement for a four-wheel drive vehicle which is provided with at least one differential or other gear box having adjustable power transmission characteristics. The control arrangement includes an adjustment element on the adjustable gear box for receiving a control signal and for adjusting the power transmission characteristics in response to that signal, and control circuitry for producing the control signal as a function of a calculated traction force difference at the wheels of th auxiliary (i.e., front) axle. In a preferred embodiment, the control signal is calculated by subtracting a vehicle driving resistance from the magnitude of a desired traction force. The vehicle driving resistance is calculated, in accordance with a known characteristic relationship, from the vehicle driving speed. The magnitude of the desired traction force is calculated from the vehicle driving speed and from a performance standard which is based upon knowledge of the vehicle operating characteristics and/or parameters. In another preferred embodiment of the invention, the control signal is calculated as a function of a speed difference between the input and output shafts (or between two output shafts) of the adjustable differential or gear box. In still another embodiment, the control signal is produced by control circuitry which incorporates both techniques of the first two embodiments. In this case, intermediate control values are produced and combined in a selected functional relationship to produce the control signal. In still another embodiments of the invention, the vehicle is provided with more than one adjustable gear box or differential, and with control circuitry for producing appropriate control signals to adjust the respective differentials in response to vehicle operating parameters.

The advantages of the invention are mainly the small number and good measurability of the sensed signals, the relatively low control requirements, the simple mechanical construction, and the resulting improvement in traction and driving behavior. The automatic control of the power transmission makes it possible for the drive to concentrate primarily on driving and if necessary in special driving conditions, to also intervene in the control. In addition, this arrangement reduces the wear of the tires of four-wheel drive vehicles and keeps the mechanical stress to the power transmission units, caused, for example, by distortions, within limits and ensures a good running performance of all components.

The invention is explained in the drawings by means of an example and will be described in detail in the following.

DETAILED DESCRIPTION OF THE DRAWINGS

Figure 1:
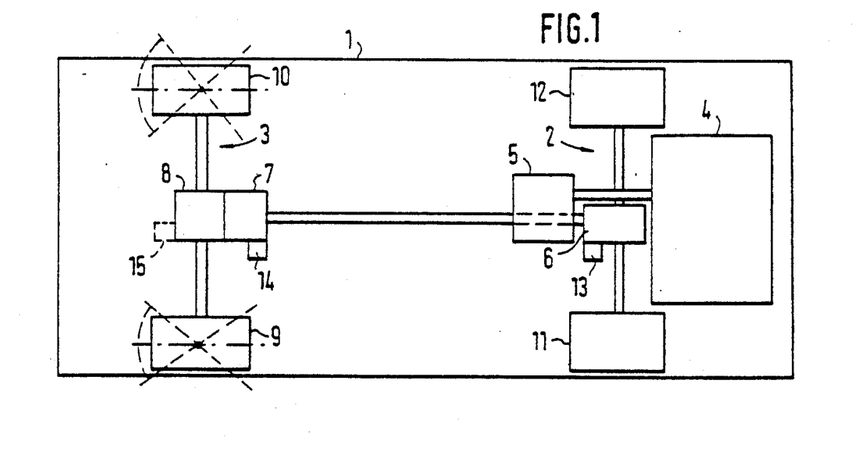
FIG. 1 is a diagrammatic view of a drive unit of a motor vehicle.

In FIG. 1, a four-wheel drive motor vehicle having a main driving axle 2 (rear axle) and an auxiliary driving axle 3 (front axle) has the reference number 1. By way of example, in the area of the main driving axle 2, here in the rear area of the motor vehicle 1, an internal-combustion engine 4 is arranged which, via a clutch-transmission unit 5, drive a transverse differential 6 of the main driving axle 2 which can be controlled continuously with respect to its power transmission characteristics (locking moment) and, in addition, via a continuously controllable longitudinal coupling 7, a differential 8 of the auxiliary driving axle 3. This differential 8, in a simple embodiment, is designed as a conventional differential gear. However, it may also be a self locking differential gear or a differential gear that can also be continuously controlled in its transmission characteristics or moment. The wheels 9, 10 of the auxiliary driving axle 3 are designed to be steerable, whereas the wheels 11, 12 of the main driving axle 2 are not steerable. Shown symbolically only are the control elements 13, 14 for effecting control of the transverse differential 6 and of the longitudinal coupling 7, as well as a control element 15 (illustrated by dashed lines) for controlling the differential of the auxiliary driving axle 3, which is required only in the case of a differential having power transmission characteristics that can be controlled continuously. The control elements may be flanged onto the units, or may be partially or completely integrated into them or may be at least partially arranged apart from the units and connected to them mechanically, hydraulically, pneumatically or electrically.

Figure 2:
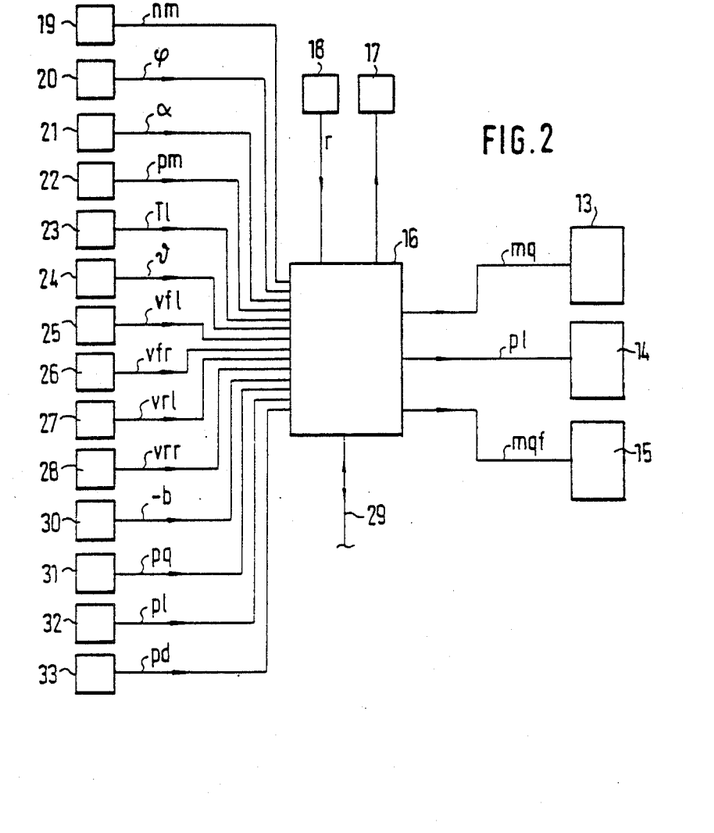
FIG. 2 is a basic wiring diagram of a control device showing input and output parameters.

The control device 16, shown in FIG. 2 with its input and output parameters, represents a maximal configuration where control element 14 of the longitudinal coupling 7, control element 13 of the transverse differential 6 and control element 15 of the differential 8 are controlled. Not all of the connected sensors illustrated are required, as a certain number if sufficient for an acceptable functioning of the arrangement.

It is assumed in this case that the control elements act in a linear way and are possibly provided with cascade control circuits. Naturally, the control circuits may also be implemented in the control device 16. Possible feedbacks of measured values are not shown in this embodiment. The connections between the function blocks shown in the Figures are considered to be analogous to the lines of a flow chart or flow diagram.

In this case, the control device 16 is preferably a microcomputer based system. The construction of the control device corresponds to a conventional process computer configuration having a central processing unit, volatile and non-volatile storage (RAM or ROM), input and output buffers, timers, etc. The construction will therefore not be discussed in detail.

Also connected to the control device 16 is a display 17 which is arranged in the vicinity of the dashboard of the motor vehicle and which supplies information to the driver concerning the current condition of the arrangement, for example, which differential is actuated at what percent, and at what percent the longitudinal coupling distributes the driving torque to the front axle. Possible errors in the arrangement may also be displayed.

An adjusting unit 18 which supplies an actuating variable r permits adjustment of the control process which may be carried out partially by the driver and partially only by service personnel. The drive should, for example, be able to select certain control processes as a function of the road condition. In the case of a vehicle that is struck in snow or in loose soil, it may, for example, make sense to adjust for a relatively rigid drive to the auxiliary driving axle and possibly a complete locking of the differential. A sensing of the friction coefficient between the wheels and the road may also be possible using the adjusting unit 18.

The word "sensing" in this case does not necessarily apply only to the sensing of a measured quantity or to a changing of the measured quantity into another physical quantity. It may also mean a processing or preprocessing of one or several sensed quantities.

In order to calculate an—internally required—standard performance Ps, the control device 16 receives an engine speed signal nm from a tachometer 19 and either a gas pedal signal $\phi$ from a gas pedal transducer 20 or a throttle valve angle signal $\alpha$ from a throttle valve angle transducer 21 and, in the case of a turbo-charged internal-combustion engine, a boost pressure signal pm from a boost pressure transducer 22 and a boost temperature signal T1 from a boost temperature transducer 23.

A sensing of a steering angle by a steering angle transducer 24 is not provided in the basic versions because the control device ensures an excellent driving behavior without a steering angle signal $\theta$. It is only required to achieve an optimal refinement and is therefore mentioned only for the sake of completeness.

The control unit 16 receives signals vfl, vfr, vrl and vrr from the transducers 25 and 26, associated with wheels 9 and 10, and from transducers 27 and 28, associated with wheels 11 and 12. These signals correspond to the speed of the wheels at the auxiliary and main driving axles 3 and 2.

These signals are also required for a control device of an anti-locking braking system (ABS) so that their sensing, in the case of vehicles that are equipped with such a system, may take place jointly, i.e., they are sensed by one of the two systems and are made available to the other one.

An external bus system 29 is provided at the control device 16, via which the control device can communicate with other digital computer systems used in the vehicle for control, measuring and information purposes, such as a control device of an ABS or an engine management computer (digital motor electronic system).

The system may also receive a delay signal $-b$ from the control device of an ABS or a stop switch, whereupon the control device 16, in the case of a vehicle that is equipped with an ABS, at least controls the control element 14 of the longitudinal coupling 7 to such an extent that the ABS can reliably sense the occurence of wheel slip and can affect the proportioning of the braking force in a controlling manner. The control device 16 also adjusts the power transmission characteristics of the couplings to an extreme condition in response to a signal from the anti-locking brake system.

In the case of vehicles without an ABS, it may also be useful to fully control the control elements 13 to 15 during braking in order to avoid an overbraking of individual wheels or axles.

Pressure transducers 31, 32 and 33, which supply signals corresponding to the control pressures pq, pl, and pd at the output of the control elements 13 to 15, may also be connected to the control device 16 for control, monitoring or indicating purposes.

Figure 3:
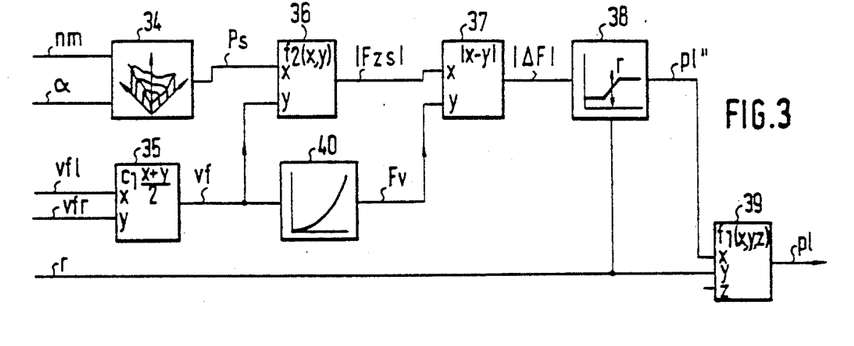
FIG. 3 is a block diagram of a control process implemented on a control device for the control of a longitudinal coupling.

The block diagram shown in FIG. 3 shows a control process for the control of the longitudinal coupling 7 to. Here, via a characteristic diagram 34 of throttle valve angle—speed preselected by the driver, a performance standard Ps is determined as a function of the current engine speed signal nm and the throttle valve angle signal $\alpha$ or the gas pedal signal $\phi$. In the case of engines which are equipped, for example, with turbo-superchargers, a boost pressure signal pm and a boost temperature signal T1 are also supplied to the characteristic diagram 34. In the case of a motor vehicle equipped with a digital motor electronic system for the control of ignition and injection, this system may already supply a signal corresponding to the magnitude of the performance standard [Ps].

Via a mean value formation system 35 weighted with a constant $c_1$, a speed vf of the wheels at the auxiliary driving axle which corresponds to a driving speed is determined from the wheel speed signals vfl and vfr. From that and from the performance standard Ps or the magnitude [Ps], via a second functional relationship $f_2$ (Ps, vf) 36 which is explained more clearly by means of a diagram below, a magnitude of a desired traction force [Fzs] is determined for the auxiliary driving axle. From that and from the driving resistance Fv at the auxiliary driving axle, by means of a difference function 37 with magnitude formation, a magnitude of a pulling force different [$\Delta$F] is determined, and from that, via a first characteristic diagram 38, a second control value pl'' is determined which, via a first functional relationship $f_1$ (pl'', r, pl') 39 is changed into a control quantity pl for the control of the control element 14 of the longitudinal coupling. The driving resistance Fv at the auxiliary driving axle in this embodiment is determined, via a characteristic driving resistance line 40, from the speed vf. The first functional relationship may also be controlled by other quantities, such as by the control parameter r of the adjusting unit 18 and/or a first control value pl' which, however, is zero here and will be explained briefly in the following. In the most simple case, the first functional relationship $f_1$ (pl'', r, pl') 39 consists of a constant translation of one of its input values to the output quantity (control quantity) pl, but may also be weighted sum of the input quantities or a weighted maximum value selection from the input quantities.

It should be noted that the term "characteristic diagram" is to be considered the characterizing term for a digitalized (i.e., sensed at supporting points) functional relationship stored in a memory storage area. In simple embodiments, it may comprise a constant, a characteristic line or a characteristic line that can be changed by one or several parameters or, in more complex arrangements, a multidimensional characteristic field that depends on several characteristic quantities, in which case quantization and interpolation takes place at values between the supporting points.

When the second control value pl'' is determined via the first characteristic diagram 38 using a single independent variable (e.g.,—the amount of the traction force difference [$\Delta$F]), an advantageous characteristic line is one which is either constant or linearly rising or which, for small values of the independent variable, has a value that corresponds to a constant basic value pl''min, or which for higher values of the independent variable, has a rising value and for still higher values of the independent variable has again a constant value that corresponds to a maximal value pl''max of the dependent variable pl''.

If, in addition, the control quantity r is also processed, a characteristic line (or a characteristic diagram) of the first characteristic diagram 38 can be changed in form, basic value pl''min, slope or maximum value pl''max, in correspondence with the value of r.

Figure 4:
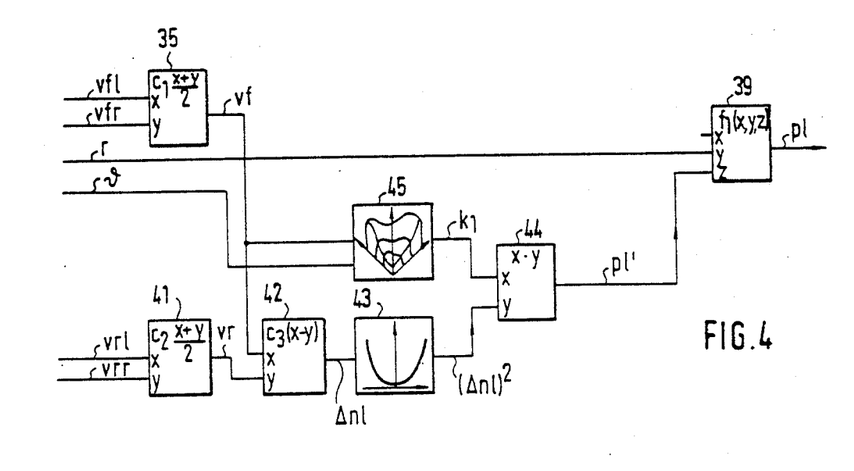
FIG. 4 is a block diagram of another control process implemented on a control device for the control of a longitudinal coupling.

FIG. 4 shows another independent control process for the control of the longitudinal coupling 7 which, however, can be advantageously combined with the control process according to FIG. 3, as will be explained in detail in FIG. 5. The mean value formation system 35 for obtaining vf and the first functional relationship 39 correspond to the relationship described with reference to FIG. 3, with the limitation that now the input quantity pl'' of the first functional relationship 39 is placed at zero and is replaced by the first control value pl'.

Via a means value formation system 41 weighted with a constant $c_2$, a speed vr of the wheels at the main driving axle 2 is determined from the wheel speed signals vrl and vrr. From a difference 42, weighted with the constant $c_3$, of the speeds of the auxiliary and the main driving axles vf and vr, a speed difference $\Delta$nl is obtained at an input and output shaft of the longitudinal coupling which, by means of an exponential and preferably squaring function 43 and multiplication 44 with a factor $k_1$, is combined to form a first control value pl'.

The factor $k_1$ can either be selected to be constant or, via second characteristic diagram 45, can be determined from vf and/or the steering angle signal $\theta$.

In the case of a constant factor $k_1$, the control of the longitudinal coupling corresponds to a centrifugal control of the speed difference $\Delta$nl at the longitudinal coupling (coupling slip).

When $k_1$ is determined only from the speed vf, the second characteristic diagram will consist of a characteristic line which rises with increasing speed vf. When, in addition, the steering angle signal $\theta$ is also monitored, the output quantity $k_1$ of the second characteristic diagram is reduced relatively strongly with the increasing magnitude of the steering angle in order to permit a good maneuverability of the motor vehicle.

Figure 5:
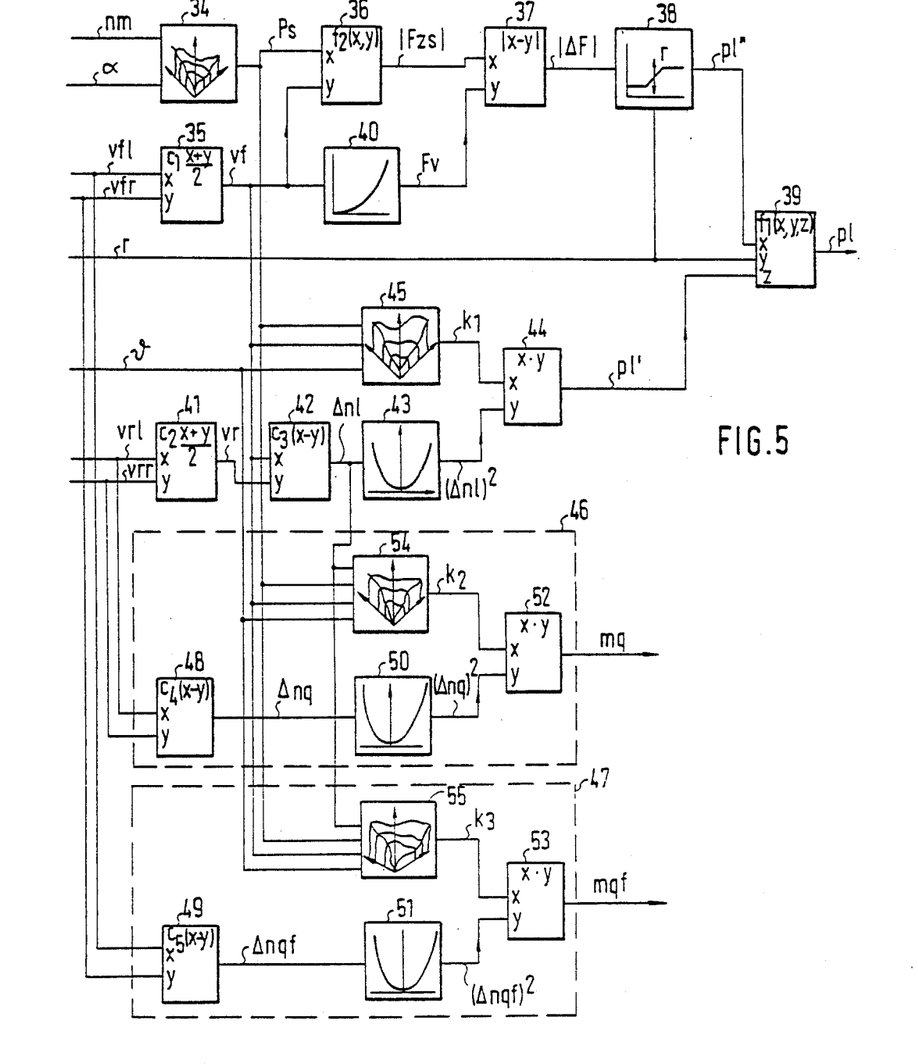
FIG. 5 is a block diagram of a combination of the control processes according to FIG. 3 and FIG. 4, with provision for the additional control of differentials at a main driving axle and an auxiliary driving axle.

FIG. 5 shows a combination of the control processes according to FIG. 3 and FIG. 4 and the joint processing of their output quantities pl'' and pl', preferably with the control quantity r, by means of the first functional relationship $f_1$ (pl'', r, pl') 39.

The control process according to FIG. 4 in this case represents an "overspeeding protection" (limiting of the coupling slip $\Delta$nl) and is therefore very advantageous and is even more effective in combination with the other processes for achieving a good driving behavior than is one of the processes alone.

Also shown are function blocks 46 and 47 for the control of a transverse differential 6 of the main driving axle 2 that can be controlled continuously with respect to its power transmission characteristics and of a differential 8 of the auxiliary driving axle 3 that can also be similarly controlled.

In this case, the functional sequences for the determination of the control quantity mq for the control of the transverse differential 6 and the control quantity mqf for the control of the differential 8 are largely identical to that for the determination of the first control value pl'. However, the corresponding characteristic diagrams and characteristic quantities must be adapted to reflect the characteristics of particular vehicles.

From differences 48 and 49 of the wheel speed signals vrl and vrr at the main driving axle and vfl and vfr at the auxiliary driving axle, speed differences $\Delta$nq and $\Delta$nqf are obtained at the output shafts of the transverse differential 6 and the differential 8 which, by means of exponential and preferably squaring functions 50 and 51 and multiplication 52 and 53 with factors $k_2$ and $k_3$, are processed to form the control quantities mq and mqf.

In this case, the factors $k_2$ and $k_3$ may be selected to be constant or may be determined via a third characteristic diagram 54 or a fourth characteristic diagram 55, respectively, from the speed difference $\Delta nl$ at the input or at the output shaft of the longitudinal coupling and/or the performance standard Ps and/or the speed vf of the wheels of the auxiliary driving axle and/or the steering angle signal $\theta$. In this case, factors $K_2$ and $K_3$ increase with increasing values of the speed difference $\Delta nl$ at the longitudinal coupling, with increasing valves of the performance standard Ps and with increasing values of the speed vf, and decrease relatively strongly with an increasing steering angle, especially at the axle with the steered wheels. The third characteristic diagram and the fourth characteristic diagram, as well as the number and selection of input quantities, may differ in this case.

The constants $c_1$ to $c_5$, the first and second functional relationships 39 and 36 and the first to fourth characteristic diagrams 38, 45, 54 and 55 are illustrated only in general terms because they require a differing adaptation for respective vehicle types. In this case, the constants $c_1$ to $c_5$ are determined by the wheel diameter and the gear ratios. For the design of the functional relationships and of the characteristic diagrams, the use of a specific example would be of little value. For this reason only general rules are indicated, by means of which the present invention can be adapted to different vehicles by those of ordinary skill in this art.

Figure 6:
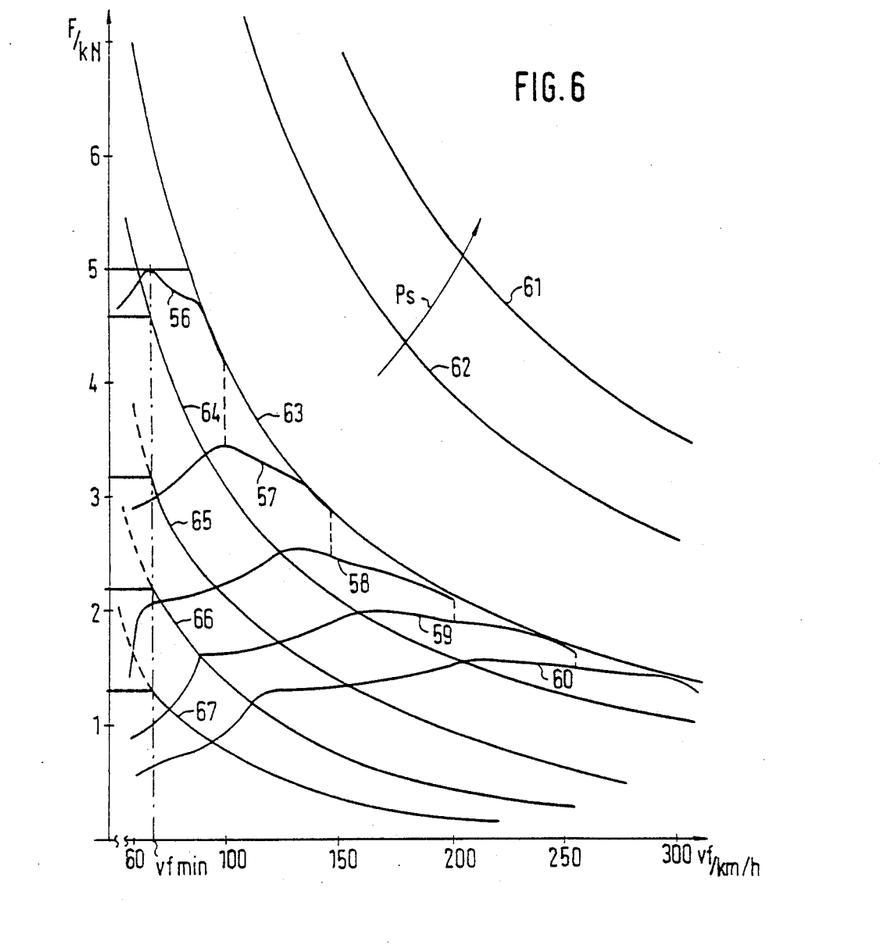
FIG. 6 is a traction force/spaced diagram.

Only the second functional relationship $f_2$ (Ps, vf) 36 for the determination of the magnitude of the desired traction force [Fzs] from the performance standard Ps and the speed vf of the wheels at the auxiliary driving axle will be discussed in more detail and explained by means of a speed—traction force diagram according to FIG. 6.

From a purely mathematical point of view, the desired traction force Fzs is obtained from a division of the performance standard Ps by the speed vf. For the speeds vf which approach zero, the desired traction force Fzs approaches infinity which, for physical reasons, is not practical as an indication of a desired value (the maximal traction force is limited by the adhesion limit between wheel and road). In addition, the division by zero resulting from vf=zero is not permitted in computer technology and generally results in a termination of the program.

In the speed/ force diagram, speed/ force characteristic lines of gears 1 to 5 (56 to 60) of an auxiliary driving axle of a vehicle are shown which represent the maximally possible traction forces of the wheels at the auxiliary driving axle of a vehicle in the individual gears as a function of the corresponding speeds vf. The highest possible value of traction force Fzfmax of the wheels at the auxiliary driving axle, at a speed vfmin, is found on the characteristic line 56 for gear 1. A vertical transition illustrated by a dashed line from one characteristic line to the next symbolizes a required shifting procedure when a maximum engine speed is reached.

Characteristic lines 61 to 67 indicate a traction force associated with particular constant values of performance standard Ps as a function of speed vf. They are hyperbolic because the pulling force is obtained from the division of the performance standard Ps by the speed vf. The characteristic line 61 may, for example, correspond to the traction force available in the case of a maximally possible engine performance.

The characteristic performance line 63 represents an envelope of the speed traction force characteristic lines 56 to 60 and may therefore be considered to be the maximally possible traction force Fzfmax of the wheels of the auxiliary driving axle.

The calculation of the desired traction force Fzs from the division of the performance standard Ps by the speed vf is not practical for the reasons discussed above at speeds below vfmin, so that it is better in those case to produce a constant value that depends only on the performance standard as the output value of the second functional relationship 36, especially when the division factor vf is determined only from the magnitude of the desired traction force [Fzs]. It is advantageous to limit the output value of the second functional relationship $f_2$ (Ps, vf) to a value Fzsmax which corresponds to the highest possible value of the traction force Fzfmax of the wheels of the auxiliary driving axle in the case of a maximum value of the second control value pl"max. These two situations are shown by the portions of characteristic lines 64 to 67 which extend generally horizontally for the traction force Fzf of the wheels of the auxiliary driving axle for Ps=constant. Otherwise a maximal value of the magnitude of the traction force difference [$\Delta F$] would exist at the output of the difference function 37, which would produce a rigid drive to the front axle and which would make the vehicle almost unsteerable during start or backing-up operations.

Naturally, the arrangement is also suitable for the control, via control value pl, of a controllable power divider or an intermediate axle differential that can be controlled continuously in its locking effect.

The magnitude of the desired traction force [Fzs], of the driving resistance [Fv], and the first, second and third factors $k_1$, $k_2$ and $k_3$ are usually determined from the driving speed. Since, however, slip should occur less frequently at the auxiliary driving axle then at the main driving axle, the driving speed can be equated to the speed of the wheels at the auxiliary driving axle. However, this does not preclude the use of other ways to determine the driving speed, such as by means of no-contact sensors or by the formation of mean values of the speeds of all wheels. Furthermore, these values can be monitored in the course of the computing process for the occurrence of implausible values and, in that event, can be estimated or corrected.

From the preceding description of the preferred embodiments, it is evident that the objects of the invention are attained, and although the invention has been described and illustrated in detail, it is to be clearly understood that the same is by way of illustration and example only, and is not to be taken by way of limitation. The spirit and scope of the invention are to be limited only by the terms of the appended claims.

What is claimed is:

1. A control arrangement for a four-wheel drive vehicle having a main axle provided with a first differential and having an auxiliary axle provided with a second differential, with the first differential driven directly and the second differential driven by coupling means having adjustable power transmission characteristics, comprising:
   adjustment on said coupling means for receiving a control signal and for adjusting the power transmission characteristics of the coupling means in response thereto;
   means for determining a vehicle driving speed;
   means for determining a desired power output;
   means for determining a magnitude of a desired traction force as a function of the vehicle driving speed and the desired power output;

means for determining a vehicle driving resistance as a function of the vehicle driving speed;

means for determining a magnitude of a traction force difference by subtracting the vehicle driving resistance from the magnitude of the desired traction force; and means for producing said control signal as a function of the traction force difference and for supplying said control signal to said adjustment means.

2. A control arrangement according to claim 1, further comprising means for communicating with at least one digital computer system used in the vehicle for at least one of control, measuring, and data processing purposes.

3. A control arrangement according to claim 2, wherein said means for communicating with a digital computer system comprises a digital bus system.

4. A control arrangement according to claim 1, wherein said control arrangement is implemented at least partially in hardware technology.

5. A control arrangement according to claim 1, further comprising self-testing means for monitoring an operating condition of the control arrangement, and means for indicating an error condition.

6. A control arrangement according to claim 1, further comprising means for manually adjusting the power transmission characteristics of the coupling means independently of said control signal.

7. A control arrangement according to claim 1, wherein the four-wheel drive vehicle has an additional gear box or differential with adjustable power transmission characteristics, and further comprising means on said additional gear box or differential for receiving said control signal and for adjusting the power transmission characteristics in response thereto.

8. A control arrangement according to claim 1, wherein said means for determining a vehicle driving speed includes means for determining a mean value of the speeds of the wheels of the auxiliary driving axle.

9. A control arrangement according to claim 1, wherein the differential which drives the main axle is a transverse differential having a pair of output shafts and adjustable power transmission characteristics, and wherein said arrangement further comprises:

means on said transverse differential for receiving said control signal and for adjusting the power transmission characteristics of the transverse differential in response thereto;

means for determining a speed difference of the output shafts of the transverse differential;

means for producing a control value as a function of the speed difference of the output shafts; and means for varying said control signal as a function of said control value and for supplying said control signal to the means for adjusting the characteristics of the transverse differential.

10. A control arrangement according to claim 1, wherein the auxiliary axle is provided with a self locking differential.

11. A control arrangement according to claim 1, wherein the auxiliary axle is provided with a transverse differential having a pair of output shafts and adjustable power transmission characteristics, and wherein said arrangement further comprises:

means on said transverse differential for receiving said control signal and for adjusting the power transmission characteristics of the transverse differential in response thereto;

means for determining a speed difference of the output shafts of the transverse differential; and means for producing a control value as a function of the speed difference of the output shafts; and means for varying said control signal as a function of said control value and for supplying said control value to the means for adjusting the characteristics of the transverse differential.

12. A control arrangement according to claim 1, wherein the first and the second differential are driven by a torque splitting gear box or differential with adjustable power transmission characteristics, and further comprising means on said additional gear box or differential for receiving said control signal and for adjusting the power transmission characteristics in response thereto.

13. A control arrangement according to claim 1, wherein said means for producing said control signal includes means for producing at least one intermediate control value as a function of the magnitude of the traction force difference, and means producing said control signal as a function of said intermediate control value.

14. A control arrangement according to claim 13, wherein said means for determining a magnitude of a desired traction force includes:

means for determining a desired power output as a function of an engine speed and a throttle value angle of a gas pedal angle, and means for combining the desired power output and the vehicle driving speed to determine the desired traction force.

15. A control arrangement according to claim 14, wherein said desired power output is determined as a function of at least one of a turbo-charger boost pressure and inlet air temperature.

16. A control arrangement according to claim 14, wherein said means for combining the desired power output and the vehicle driving speed includes means for dividing the desired power output by the driving speed when the driving speed exceeds a predetermined minimum level, and wherein the resulting desired traction force is limited to a predetermined maximum value.

17. A control arrangement according to claim 16, wherein said dividing means includes means for dividing the desired power output by the predetermined minimum level when the driving speed is below said minimum level.

18. A control arrangement according to claim 13, further comprising adjusting means for producing an adjusting control value, and means for combining said adjusting control value and said intermediate control value to produce said control signal.

19. A control arrangement according to claim 18, wherein said combining means includes means for combining said adjusting and intermediate control values in a weighted sum relationship.

20. A control arrangement according to claim 18, wherein said combining means includes means for selecting a maximum value of said adjusting and intermediate control values.

21. A control arrangement according to claim 13, wherein said means for producing an intermediate control value includes means for setting said intermediate control value equal to a predetermined minimum value as the magnitude of the traction force difference approaches zero, means for increasing the intermediate control value at a rate as the magnitude of the traction force difference increases, and means for setting said intermediate control value equal to a predetermined maximum value when the magnitude of the pulling force difference exceeds a predetermined level.

22. A control arrangement according to claim 21, further comprising adjusting means for producing an adjusting control value, and means for varying at least one of said predetermined minimum value, said rate of increase, and said predetermined maximum value as a function of said adjusting control value.

23. A control arrangement according to claim 21, wherein said adjustment means on said coupling means adjusts the power transmission characteristics of the coupling means such that a traction force is distributed to the main axle and the auxiliary axle in correspondence with a ratio of a stationary axle load distribution when said intermediate control value is equal to said predetermined maximum value.

24. A control arrangement according to claim 13, wherein said means for producing an intermediate control value includes means for setting said intermedaite control value equal to a constant value.

25. A control arrangement according to claim 24, further comprising adjusting means for producing an adjusting control value, and means for varying said constant value as a function of said adjusting control value.

26. A control arrangement according to claim 13, wherein said means for producing an intermediate control value includes means for varying said intermediate control value as a linear fnction of the magnitude of the traction foce difference.

27. A control arrangement according to claim 26, further comprising adjusting means for producing an adjusting control value, and means for changing the linear relationship existing between the magnitude of the traction force difference and the intermediate control value.

28. A control arrangement according to claim 13, further comprising adjusting means for producing an adjusting control value, means for sensing a coefficient of friction between wheels of the main and auxiliary axles and a road surface by adjusting said adjusting means, and means for varying said intermediate control value as a function of the coefficient of friction.

29. A control arrangement according to claim 28, wherein said adjusting means can be adjusted by a driver of the vehicle.

30. A control arrangement according to claim 1, wherein said four-wheel drive vehicle is equipped with an anti-locking braking system, and wherein said control arrangement includes means for receiving a signal from the anti-locking braking system during a braking operation, and said means for producing said control signal is responsive to said signal from the anti-locking braking system.

31. A control arrangement according to claim 1, further comprising display means in a dashboard of the vehicle for displaying a current condition of the control arrangement.

32. A control arrangement for a four-wheel drive vehicle having a main axle provided with a first differential and having an auxiliary axle provided with a second differential with the first differential driven directly and the second differential driven by coupling means having input and output shafts and adjustable between a plurality of power transmission characteristics between fully engaged and disengaged, comprising:

adjustment means on said coupling means for receiving a control signal and for adjusting the power transmission characteristics of the coupling in response thereto;

means for determining a speed difference of the input and output shafts of the coupling means; and means for producing said control signal as a function of the speed difference and for supplying said control signal to the adjustment means;

wherein the control signal varies exponentially with the speed difference.

33. A control arrangement according to claim 32, wherein the differential which drives the main axle is a transverse differential having a pair of output shafts and adjustable power transmission characteristics, and wherein said arrangement further comprises:

means on said transverse differential for receiving a control value and for adjusting the power transmission characteristics of the transverse differential in response thereto;

means for determining a speed difference of the output shafts of the transverse differential; and means for producing said control value as a function of an exponential power of the speed difference of the output shafts and for supplying said control value to the means for adjusting the characteristics of the transverse differential.

34. A control arrangement according to claim 32, wherein the auxiliary axle is provided with a transverse differential having a pair of output shafts and adjustable power transmission characteristics, and wherein said arrangement further comprises:

means on said transverse differential for receiving a control value and for adjusting the power transmission characteristics of the transverse differential in response thereto;

means for determining a speed difference of the output shafts of the transverse differential; and means for producing said control value as a function of the speed difference of the output shafts and for supplying said control value to the means for adjusting the characteristics of the transverse differential.

35. A control arrangement according to claim 32, further comprising display means in a dashboard of the vehicle for displaying a current condition of the control arrangement.

36. A control arrangement according to claim 32, further comprising means for communicating with at least one digital computer system used in the vehicle for at least one of control, measuring, and data processing purposes.

37. A control arrangement according to claim 36, wherein said means for communicating with a digital computer system comprises a digital bus system.

38. A control arrangement according to claim 32, wherein said control arrangement is implemented at least partially in hardware technology.

39. A control arrangement according to claim 32, further comprising self-testing means for monitoring an operating condition of the control arrangement, and means for indicating an error condition.

40. A control arrangement according to claim 32, further comprising means for manually adjusting the power transmission characteristics of the coupling means independently of said control signal.

41. A control arrangement according to claim 32, wherein the first and the second differential are driven by a torque splitting gar box or differential with adjustable power transmission characteristics, and further comprising means on said additional gear box or differential for receiving said control signal and for adjusting the power transmission characteristics in response thereto.

42. A control arrangement for a four-wheel drive vehicle having a main axle provided with a first differential and having an auxiliary axle provided with a second differential, with the first differential driven directly and the second differential driven by coupling means having input and output shafts and adjustable power transmission characteristics, comprising:
   adjustment means on said coupling means for receiving a control signal and for adjusting the power transmission characteristics of the coupling in response thereto;
   means for determining a speed difference of the input and the output shafts of the coupling means; and
   means for producing said control signal as a function of the speed difference and for supplying said control signal to the adjustment means;
   wherein the control signal varies exponentially with the speed difference; and
   wherein said means for producing said control signal includes means for producing at least one intermediate control value as a function of a combination of an exponential power of the speed difference and a first control factor which is used to produce said control signal.

43. A control arrangement according to claim 42, wherein said first control factor and said exponential power of the speed difference are combined by a multiplication operation.

44. A control arrangement according to claim 42, further comprising adjusting means for producing an adjusting control value, and means for combining said adjusting value and said intermediate control value to produce said control signal.

45. A control arrangement according to claim 44, wherein said combining means includes means for combining said adjusting and intermediate control values in a weighted sum relationship.

46. A control arrangement according to claim 44, wherein said combining means includes means for selecting a maximum value of said adjusting and intermediate control values.

47. A control arrangement according to claim 42, further comprising display means in a dashboard of the vehicle for displaying a current condition of the control arrangement.

48. A control arrangement according to claim 42, further comprising means for communicating with at least one digital computer system used in the vehicle for at least one of control, measuring, and data processing purposes.

49. A control arrangement according to claim 48, wherein said means for communicating with a digital computer system comprises a digital bus system.

50. A control arrangement according to claim 42, wherein said control arrangement is implemented at least partially in hardware technology.

51. A control arrangement according to claim 42, further comprising a self-testing means for monitoring an operating condition of the control arrangement, and means for indicating an error condition.

52. A control arrangement according to claim 42, further comprising means for manually adjusting the power transmission characteristics of the coupling means independentaly of said control signal.

53. A control arrangement according to claim 42, wherein the first and the second differential are driven by a torque splitting gear box or differential with adjustable power transmission characteristics, and further comprising means on said additional gear box or differential for receiving said control signal and for adjusting the power transmission characteristics in response thereto.

54. A control arrangement for a four-wheel drive vehicle having a main axle provided with a first differential and having an auxiliary axle provided with a second differential, with the first differential driven directly and the second differential driven by coupling means having input and output shafts and adjustable power transmission characteristics, comprising:
   adjustment means on said couplng means for receiving a control signal and for adjusting the power transmission characteristics of the coupling in response thereto;
   means for determining a speed difference of the input and the output shafts of the coupling means; and
   means for producing said control signal as a function of the speed difference and for supplying said control signal to the adjustment means;
   wherein the control signal varies exponentially with the speed difference; and
   wherein said four-wheel drive vehicle is equipped with an anti-locking braking system, and wherein said control arrangement includes means for receiving a signal from the anti-locking braking system during a braking operation, and said means for producing said control signal is reponsive to said signal from the anti-locking braking system.

55. A control arrangement for a four-wheel drive vehicle having a main axle provided with a first differential and having an auxiliary axle provided with a second differential, with the first differential driven directly and the second differential driven by coupling means having input and output shafts and adjustable power transmission characteristics, comprising:
   adjustment means on said coupling means for receiving a control signal and for adjusting the power transmission characteristics of the coupling in response thereto;
   means for determining a vehicle driving speed;
   means for determining a desired power output;
   means for determining a magnitude of a desired traction force as a function of the vehicle driving speed and the desired power output;
   means for determining a vehicle driving resistance as a function of the vehicle driving speed;
   means for determining a magnitude of a traction force difference by subtracting the vehicle driving resistance from the magnitude of the desired traction force;
   means for determining a speed difference of the input and the output shafts of the coupling means; and
   means for producing said control signal as a function of the pulling force difference and the speed difference and for supplyng said control signal to said adjustment means.

56. A control arrangement according to claim 55, wherein said first differential is a transverse differential having a pair of output shafts and adjustable power transmission characteristics, and wherein said arrangement further comprises:

means on said first differential for receiving a first control value and for adjusting the power transmission characteristics of the first differential in response thereto;

means for determining a speed difference of the output shafts of the first differential; and means for producing said first control value as a function of an exponential power of the speed difference of the output shafts and for supplying said first control value to the means for adjusting the characteristics of the first differential.

57. A control arrangement according to claim 56, wherein the auxiliary axle is provided with a transverse differential having a pair of output shafts and adjustable power transmission characteristics, and wherein said arrangement further comprises:

means on said auxiliary axle differential for receiving a second control value and for adjusting the power transmission characteristics of the auxiliary axle differential in response thereto;

means for determining a speed difference of the output shafts of the auxiliary axle differential; and means for producing said second control value as a function of an exponential power of the speed difference of the output shafts and for supplying said second control value to the means for adjusting the characteristics of the auxiliary axle differential.

* * * * *